(12) United States Patent
Rotter et al.

(10) Patent No.: US 11,247,413 B2
(45) Date of Patent: Feb. 15, 2022

(54) COMPOSITE PARTS INCLUDING HYBRID PLIES, METHODS OF FORMING THE COMPOSITE PARTS, AND SYSTEMS FOR FORMING THE COMPOSITE PARTS

(71) Applicant: The Boeing Company, Chicago, IL (US)

(72) Inventors: Daniel M. Rotter, Lake Forest Park, WA (US); Bradley Andrew Coxon, Everett, WA (US); Kurtis S. Willden, Kent, WA (US); Stephen Lee Metschan, Black Diamond, WA (US); Paul Chace Wilcoxson, Kent, WA (US); Joseph Jay Pruss, Redmond, WA (US); Darrell D. Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 231 days.

(21) Appl. No.: 16/222,869

(22) Filed: Dec. 17, 2018

(65) Prior Publication Data
US 2020/0189213 A1 Jun. 18, 2020

(51) Int. Cl.
*B29C 70/30* (2006.01)
*B29C 70/54* (2006.01)
*B29L 31/30* (2006.01)

(52) U.S. Cl.
CPC .............. *B29C 70/30* (2013.01); *B29C 70/54* (2013.01); *B29L 2031/3076* (2013.01)

(58) Field of Classification Search
None
See application file for complete search history.

(56) References Cited

U.S. PATENT DOCUMENTS 4,475,976 A 10/1984 Mittelstadt et al.
5,209,804 A 5/1993 Trudeau
(Continued)

FOREIGN PATENT DOCUMENTS

| DE | 102013105080 | 11/2014 |
|---|---|---|
| DE | 102016117798 | 3/2018 |
| WO | WO 2008/110614 | 9/2008 |

OTHER PUBLICATIONS

U.S. Appl. No. 14/926,298, filed Oct. 29, 2015, Metschan et al.
(Continued)

*Primary Examiner* — Ronak C Patel
(74) *Attorney, Agent, or Firm* — Dascenzo Gates Intellectual Property Law, P.C.

(57) ABSTRACT

Composite parts including hybrid plies, methods of forming the composite parts, and systems for forming the composite parts are disclosed herein. The composite parts include a plurality of plies of composite material. At least one ply is a hybrid ply. The hybrid ply is defined by a plurality of distinct ply tiles, and at least one distinct ply tile in the plurality of distinct ply tiles defines at least one ply tile property that differs from a corresponding ply tile property of at least one other distinct ply tile in the plurality of distinct ply tiles. The methods include selecting at least one distinct ply tile and positioning the at least one distinct ply tile. The methods also include selecting at least one other distinct ply tile and positioning the at least one other distinct ply tile. The systems include systems that define the composite parts and/or perform the methods.

20 Claims, 8 Drawing Sheets

(56) References Cited

U.S. PATENT DOCUMENTS

| | | | |
|---|---|---|---|
| 5,427,518 | A | 6/1995 | Morizot et al. |
| 7,228,611 | B2 | 6/2007 | Anderson et al. |
| 7,879,177 | B2 | 2/2011 | McCowin et al. |
| 8,142,181 | B2 | 3/2012 | Willden et al. |
| 8,568,551 | B2 | 10/2013 | Brennan et al. |
| 8,752,293 | B2 | 6/2014 | Jones et al. |
| 8,916,010 | B2 | 12/2014 | Brennan et al. |
| 8,936,695 | B2 | 1/2015 | Rotter et al. |
| 8,974,618 | B1 | 3/2015 | Rotter et al. |
| 9,211,679 | B1 | 12/2015 | Metschan et al. |
| 9,314,976 | B2 | 4/2016 | Robins et al. |
| 9,375,908 | B2 | 6/2016 | Metschan et al. |
| 9,511,548 | B1 | 12/2016 | Rotter et al. |
| 9,764,499 | B2 | 9/2017 | Jones et al. |
| 9,770,871 | B2 | 9/2017 | Brennan et al. |
| 2014/0065354 | A1 | 3/2014 | Smith, Jr. et al. |
| 2014/0339732 | A1 | 11/2014 | Asanuma |
| 2016/0368226 | A1 | 12/2016 | Encinosa et al. |
| 2017/0054208 | A1* | 2/2017 | Pietila .................. H01Q 1/28 |
| 2017/0282491 | A1* | 10/2017 | Tsotsis .................. B32B 7/02 |
| 2017/0368766 | A1 | 12/2017 | Brennan et al. |
| 2019/0040760 | A1* | 2/2019 | Clegg .................. F01D 5/282 |

OTHER PUBLICATIONS

European Patent Office, Extended European Search Report for related European Patent Application No. 19212964, dated May 6, 2020.

Machine-generated English translation of the abstract of WO 2008/110614, download from Espacenet.com on Jul. 24, 2020.

Machine-generated English translation of the abstract of DE 102013105080, download from Espacenet.com on Jul. 24, 2020.

Machine-generated English translation of the abstract of DE 102016117798, download from Espacenet.com on Jul. 24, 2020.

\* cited by examiner

COMPOSITE PARTS INCLUDING HYBRID PLIES, METHODS OF FORMING THE COMPOSITE PARTS, AND SYSTEMS FOR FORMING THE COMPOSITE PARTS

FIELD

The present disclosure relates to composite parts including hybrid plies, to methods of forming the composite parts, and/or to systems for forming the composite parts.

BACKGROUND

Composite parts generally include a plurality of plies, or layers, of composite material. The plies typically are laid up, or stacked, one layer at a time, while the composite material is in an uncured state and subsequently cured to bond the plies together and/or to harden the plies and generate the composite part. The plies may include large sheets of composite material that are manually and/or mechanically laid up and/or lengths of composite tape that are positioned on a forming surface in strips and/or by wrapping the lengths of composite tape around the forming surface.

It is conventional for a given ply, or layer, within the composite part to have constant, or at least substantially constant, material properties. As examples, the same composite material may extend throughout the given ply and/or a fiber orientation of the composite material may be constant, or at least substantially constant, within the given ply. While such conventional composite parts may be effective in certain circumstances, they may be time-consuming to manufacture. Additionally or alternatively, the uniformity of plies within conventional composite parts may require that an entirety of the composite part be conservatively designed, such as based on the highest stress region of the composite part. As such, a remainder of the composite part may be over-designed, thereby increasing cost, increasing weight, and/or decreasing manufacturing efficiency. Furthermore, it may be challenging to form composite parts that have complex shapes utilizing conventional composite manufacturing technologies. Thus, there exists a need for composite parts including hybrid plies, for methods of forming the composite parts, and/or for systems for forming the composite parts.

SUMMARY

Composite parts including hybrid plies, methods of forming the composite parts, and systems for forming the composite parts are disclosed herein. The composite parts include a plurality of plies of composite material. At least one ply in the plurality of plies is a hybrid ply. The hybrid ply is defined by a plurality of distinct ply tiles, and at least one distinct ply tile in the plurality of distinct ply tiles defines at least one ply tile property that differs from a corresponding ply tile property of at least one other distinct ply tile in the plurality of distinct ply tiles.

The methods include selecting at least one distinct ply tile from a selection of distinct ply tiles and positioning the at least one distinct ply tile at a predetermined location along a layup surface of a layup mandrel to define a first region of a hybrid ply of the composite part. The methods also include selecting a least one other distinct ply tile from the selection of distinct ply tile and positioning the at least one other distinct ply tile at another predetermined location along the layup surface to define a second region of the hybrid ply.

The systems include a layup mandrel that defines a layup surface configured to receive a plurality of plies of composite material and to shape the plurality of plies of composite material to a desired part contour. The systems also include a selection of distinct ply tiles, and each distinct ply tile in the selection of distinct ply tiles is configured to be positioned in at least one predetermined location along the layup surface. The systems further include a positioning device. The positioning device is programmed to select a selected distinct ply tile from the selection of distinct ply tiles and to position the selected distinct ply tile at a corresponding predetermined location along the layup mandrel to at least partially define the composite part.

DESCRIPTION

Figure 1:
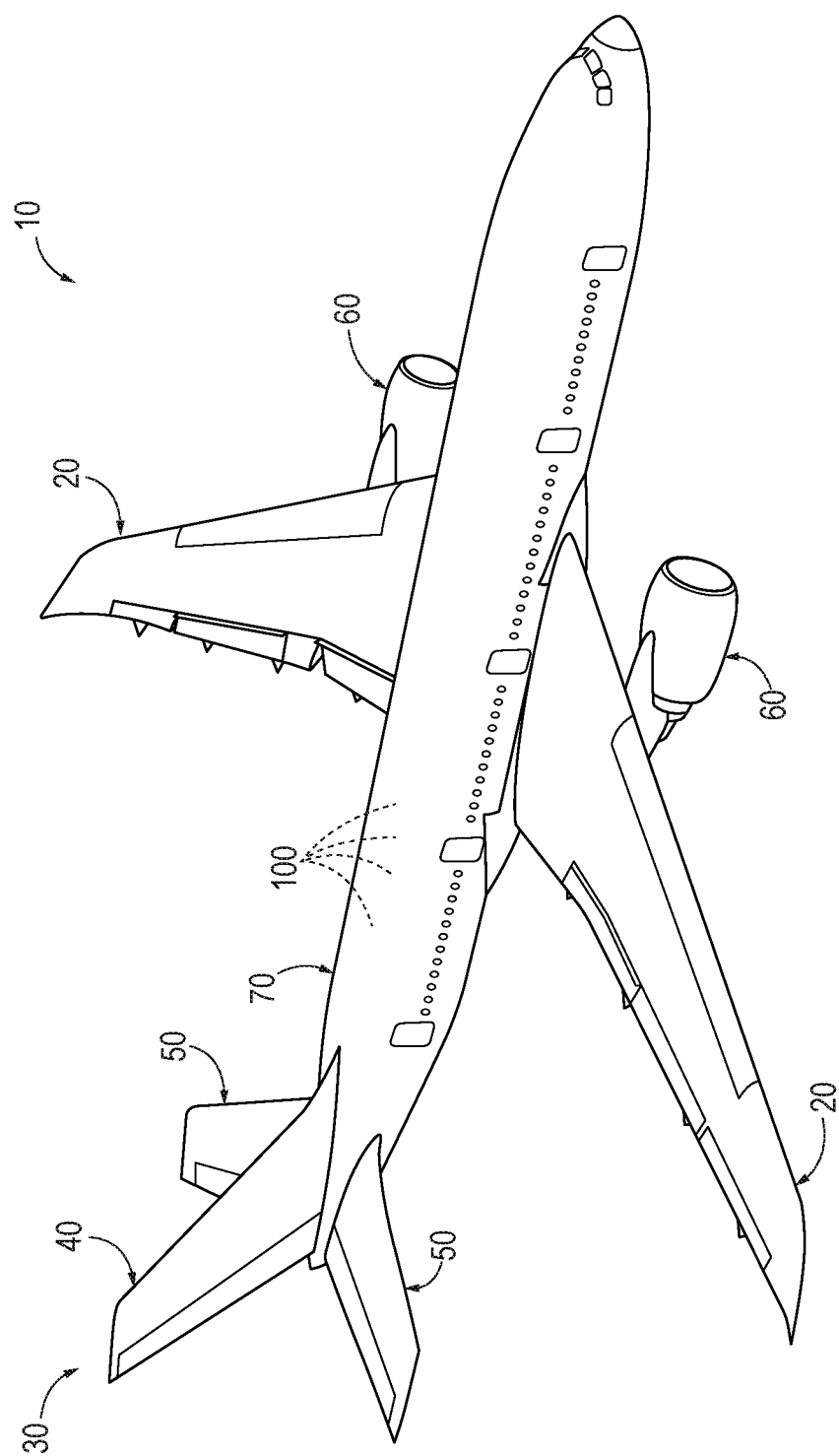
FIG. 1 is a schematic illustration of examples of an aircraft that may include composite parts and/or that may be manufactured utilizing the systems and/or methods according to the present disclosure.

FIGS. 1-15 provide illustrative, non-exclusive examples of aircraft, of composite parts, of systems, and/or of methods, according to the present disclosure. Elements that serve a similar, or at least substantially similar, purpose are labeled with like numbers in each of FIGS. 1-15, and these elements may not be discussed in detail herein with reference to each of FIGS. 1-15. Similarly, all elements may not be labeled in each of FIGS. 1-15, but reference numerals associated therewith may be utilized herein for consistency. Elements, components, and/or features that are discussed herein with reference to one or more of FIGS. 1-15 may be included in and/or utilized with any of FIGS. 1-15 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic illustration of examples of an aircraft 10, according to the present disclosure. Aircraft 10 may include a plurality of components including wings 20, a tail assembly 30, a vertical stabilizer 40, a horizontal stabilizer 50, an engine 60 and/or a fuselage 70. One or more of these components may include at least one composite part 100 according to the present disclosure. Additionally or alternatively, aircraft 10 may be formed utilizing systems 200 and/or methods 300, according to the present disclosure.

Figure 2:
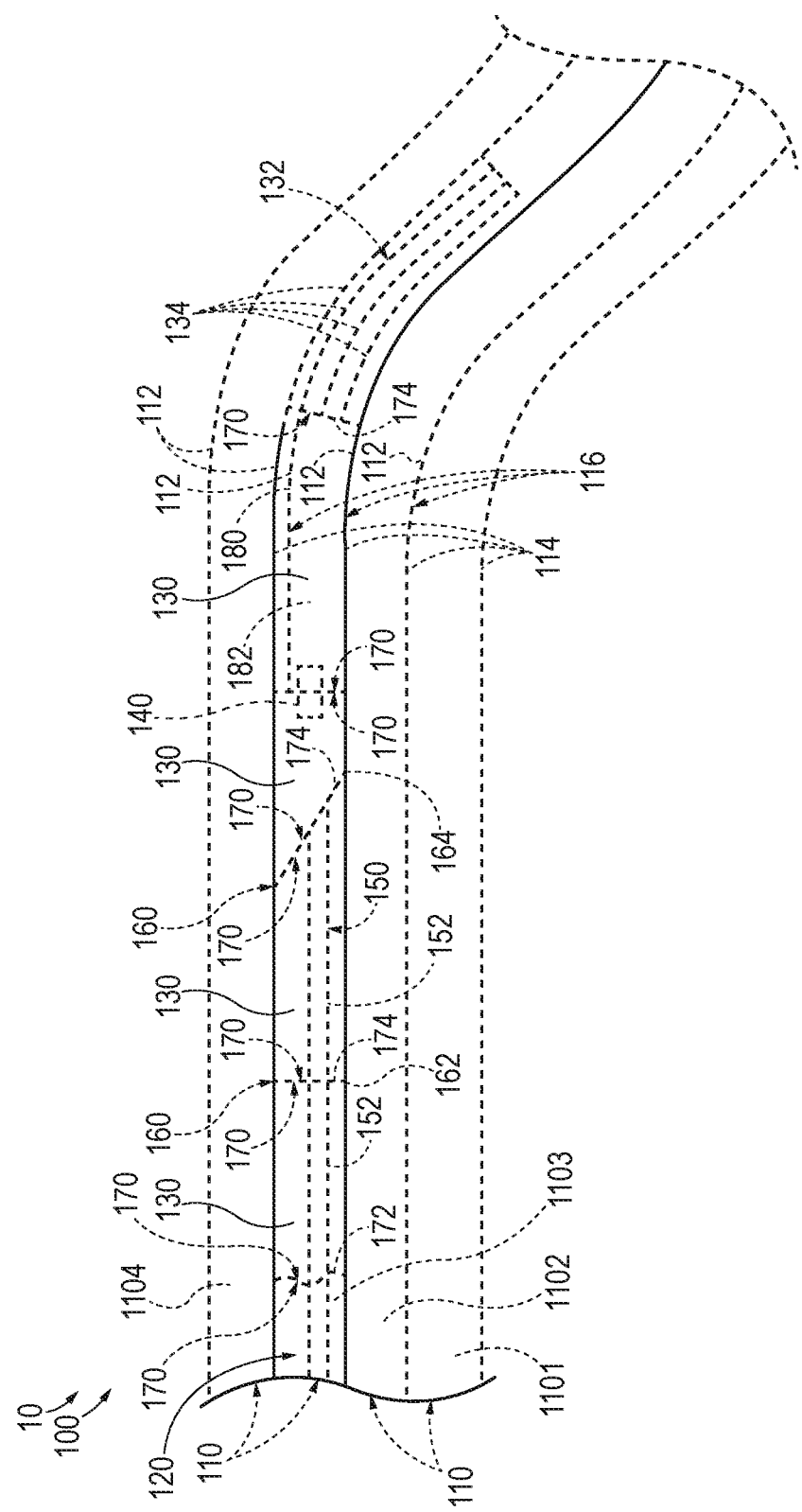
FIG. 2 is a schematic illustration of examples of a composite part according to the present disclosure.

FIG. 2 is a schematic illustration of examples of a composite part 100 according to the present disclosure. As discussed, composite part 100 may form a portion of an aircraft 10. Composite part 100 includes a plurality of plies 110 of composite material. Plies 110 also may be referred to herein as layers 110, and each ply 110 may be distinct and/or separate from other plies 110 in the plurality of plies of composite material. Stated another way, plies 110 may be assembled in a step-wise fashion with, for example, a first ply 1101 being positioned prior to a second ply 1102. Similarly, a third ply 1103 may be positioned subsequent to second ply 1102 and/or prior to a fourth ply 1104. Stated yet another way, each ply 110 may have and/or define an upper surface 112 and a lower surface 114, and upper surface 112 and lower surface 114 of adjacent plies 110 may define a surface interface region 116 between the adjacent plies. As illustrated in FIG. 2, at least one ply 110 in the plurality of plies is a hybrid ply 120. Hybrid ply 120 is defined by a plurality of distinct ply tiles 130. Distinct ply tiles 130 may be separately and/or independently formed and/or fabricated and separately and/or independently positioned relative to one another to form and/or define hybrid ply 120. Stated another way, hybrid ply 120 may include, may be, and/or may be defined by a mosaic of distinct ply tiles 130.

At least one distinct ply tile 130 in the plurality of distinct ply tiles 130 may define at least one tile property that differs from, that is distinct from, and/or that is dissimilar to, a corresponding ply tile property of at least one other distinct ply tile 130 in the plurality of distinct ply tiles 130. Stated another way, distinct ply tiles 130 within a given hybrid ply 120 may not be identical and/or may be at least partially dissimilar, such as may be due to variation in tile properties among the plurality of distinct ply tiles 130.

In practice, composite parts 100 including hybrid plies 120 may provide distinct benefits over conventional composite parts that only include continuous and/or homogeneous plies of composite materials. As an example, formation of at least one ply 110 from distinct ply tiles 130 may increase a rate of production, or layup, for composite part 100, as distinct ply tiles 130 may be pre-manufactured and/or pre-staged prior to layup and/or assembly. This may decrease a period of time during which a layup mandrel must be utilized to generate composite part 100. As another example, the properties of distinct ply tiles 130 may be location-specific. Stated another way, the properties of a given distinct ply tile 130 may be selected based, at least in part, on a location of the given distinct ply tile within composite part 100. This permit and/or facilitate property variation, across composite part 100, that is impossible and/or impractical with conventional composite layup techniques. Additionally or alternatively, this may permit and/or facilitate layup of more complex shapes when compared to conventional composite layup techniques.

As discussed, at least one distinct ply tile 130 may define at least one tile property that differs from, that is distinct from, and/or that is dissimilar to, the corresponding ply tile property of at least one other distinct ply tile 130. The at least one tile property may include and/or be any suitable physical, mechanical, spatial, and/or chemical property of the at least one distinct ply tile 130 that differs from the corresponding ply tile property of the at least one other distinct ply tile 130. Examples of the at least one tile property include a tile shape of the at least one ply tile, a tile thickness of the at least one ply tile, a tile material of the at least one ply tile, a fiber orientation within the at least one ply tile, a ply orientation of the at least one ply tile within hybrid ply 120, a ply size of the at least one ply tile, a ply volume of the at least one ply tile, a ply surface area of the at least one ply tile, a weight fraction of resin material within the at least one ply tile, a weight fraction of fiber within the at least one ply tile, and/or a state-of-cure of the at least one ply tile.

Distinct ply tiles 130, which also may be referred to herein as distinct ply tiles 130 and/or as tiles 130, may be formed from any suitable tile material and/or tile materials. Examples of suitable tile material include a composite fiber, an aramid fiber, a fiberglass fiber, a graphite fiber, a resin material, a pre-impregnated composite ply, a thermoset material, a thermoplastic material, a honeycomb core material, a foam, an adhesive, a fluoropolymer elastomer, an electrically conductive material, an electrically insulating material, a filler material, nanoparticles, and/or silicone.

It is within the scope of the present disclosure that the tile material of distinct ply tiles 130 within a given hybrid ply 120 may be constant, or at least substantially constant. Alternatively, it is also within the scope of the present disclosure that the tile material may vary among distinct ply tiles 130. Stated another way, the tile material of at least one distinct ply tile 130 may differ from the tile material of at least one other distinct ply tile 130 within given hybrid ply 120. Under these conditions, and when tile properties differ within given hybrid ply 120, the at least one tile property may include and/or be the tile material that is defined by the at least one distinct ply tile 130 and the corresponding tile property may include and/or be a corresponding tile material that is defined by the at least one other distinct ply tile 130.

As illustrated in dashed lines in FIG. 2, composite part 100 may include an electrical circuit 150. Electrical circuit 150 may be at least partially defined by and/or within distinct ply tiles 130 and may include a plurality of electrical conductors 152 that may extend within distinct ply tiles 130. Electrical circuit 150 may permit and/or facilitate regulation and/or control of localized electrical properties of and/or within composite part 100 and may be utilized, for example, to provide lightning strike protection, such as when composite part 100 forms a portion of aircraft 10. Under these conditions, and when tile properties differ within given hybrid ply 120, the at least one tile property may include and/or be a circuit layout of the at least one distinct ply tile 130 and the corresponding tile property may include and/or be a corresponding circuit layout of the at least one other distinct ply tile 130.

Distinct ply tiles 130 may have and/or define any suitable tile shape. The tile shape may be defined within upper surface 112 and/or lower surface 114 of hybrid ply 120. Examples of suitable tile shape include a polygonal tile shape, a triangular tile shape, a square tile shape, a rectangular tile shape, and/or a hexagonal tile shape. It is within the scope of the present disclosure that distinct ply tiles 130 may be shaped to nest with, to abut, to mate with, and/or to interlock with adjacent distinct ply tiles 130 within a given hybrid ply 120. Stated another way, the tile shape of a given distinct ply tile 130 may be selected to permit and/or to facilitate placement of the given distinct ply tile 130 within the given hybrid ply 120 and/or in contact with the adjacent distinct ply tiles 130.

Figure 3:
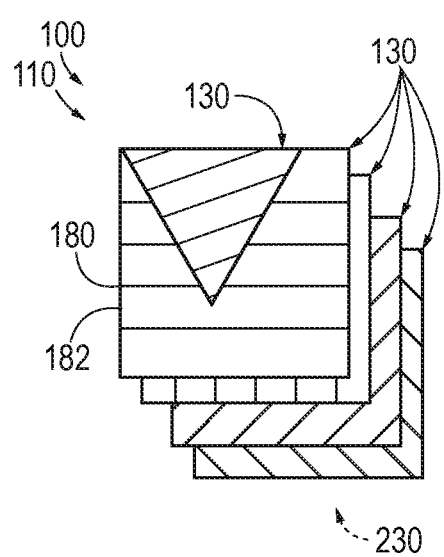
FIG. 3 is a schematic top view illustrating an example of a selection of distinct ply tiles that may be included in the composite parts and/or that may be utilized with the systems and/or methods according to the present disclosure.
Figure 4:
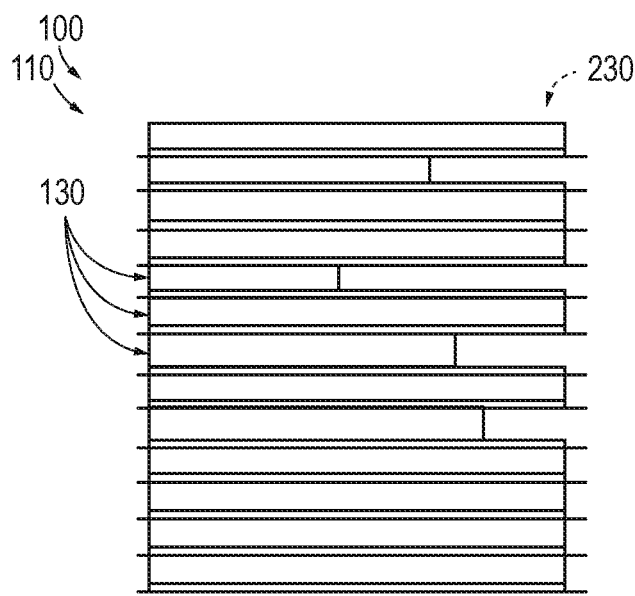
FIG. 4 is a schematic side view illustrating an example of a selection of distinct ply tiles that may be included in the composite parts and/or that may be utilized with the systems and/or methods according to the present disclosure.
Figure 5:
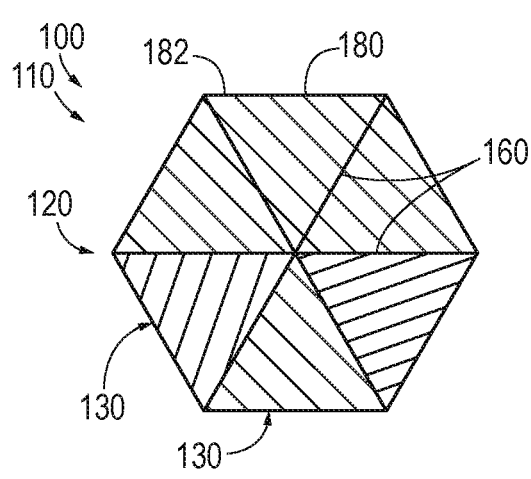
FIG. 5 is a schematic top view illustrating an example of a hybrid ply according to the present disclosure.
Figure 6:
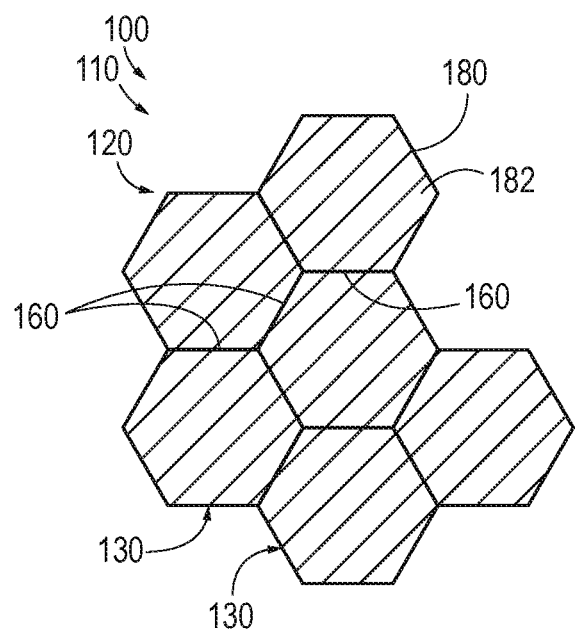
FIG. 6 is a another schematic top view illustrating an example of a hybrid ply according to the present disclosure.
Figure 7:
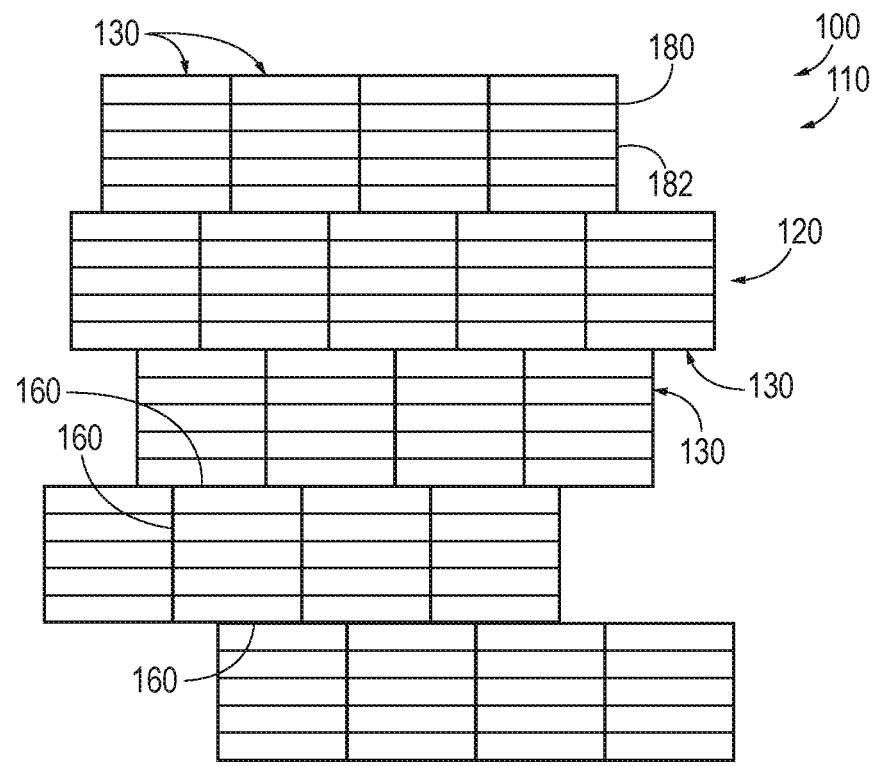
FIG. 7 is a another schematic top view illustrating an example of a hybrid ply according to the present disclosure.
Figure 8:
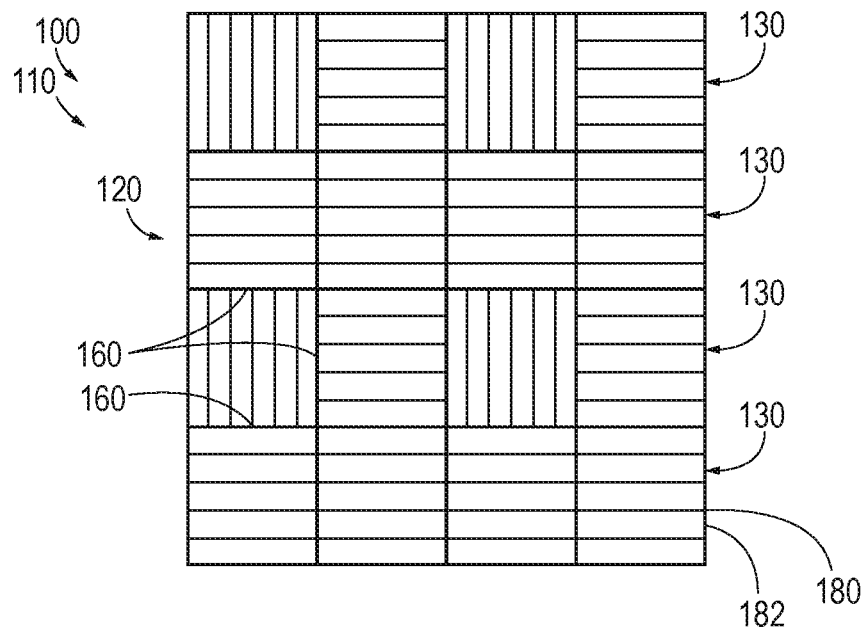
FIG. 8 is a another schematic top view illustrating an example of a hybrid ply according to the present disclosure.
Figure 9:
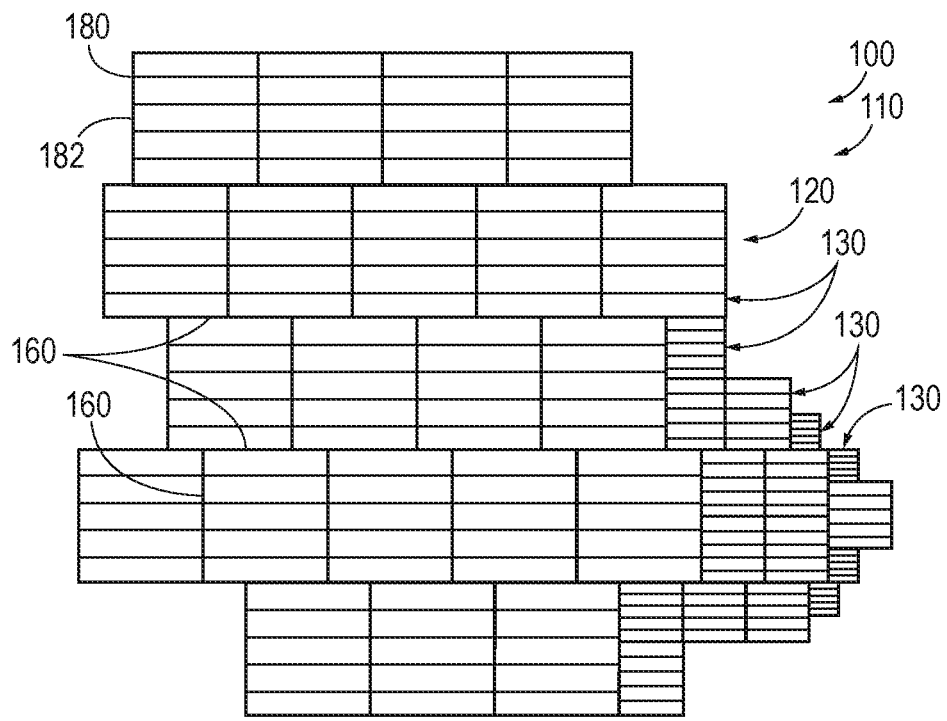
FIG. 9 is a another schematic top view illustrating an example of a hybrid ply according to the present disclosure.

FIGS. 3-4 illustrate examples of distinct ply tiles 130 that may be arranged within hybrid plies 120 of FIGS. 2 and 5-11, according to the present disclosure. More specifically FIG. 3 is a schematic top view of distinct ply tiles 130, while FIG. 4 is a schematic side view of the ply tiles. FIGS. 3-4 illustrate that distinct ply tiles 130 may vary in size and/or in shape and illustrate examples of triangular and square tile shapes. FIGS. 5-9 are schematic top view of hybrid plies 120 defined by distinct ply tiles 130, according to the present disclosure. FIG. 5 illustrates a triangular tile shape, FIG. 6 illustrates a hexagonal tile shape, and FIGS. 7-9 illustrate both square and rectangular tile shapes.

As perhaps best illustrated by FIGS. 5-6, it is within the scope of the present disclosure that the tile shape of distinct ply tiles 130 within a given hybrid ply 120 may be constant. Stated another way, each distinct ply tile 130 within the given hybrid ply 120 may have and/or define the same, or at least substantially the same, ply shape. Such a configuration, while not required of all embodiments, may permit and/or facilitate ready placement of each distinct ply tile 130 within the given hybrid ply 120 and/or may permit and/or facilitate complete coverage within the given hybrid ply by the distinct ply tiles.

Alternatively, and as perhaps best illustrated by FIGS. 7-9, it is within the scope of the present disclosure that the tile shape of distinct ply tiles 130 within a given hybrid ply 120 may vary. Stated another way, the shape of at least one distinct ply tile 130 may differ from the shape of at least one other distinct ply tile 130 within given hybrid ply 120. This variation in shape may include and/or be a variation between and/or among different polygonal shapes for distinct ply tiles 130, as illustrated in FIGS. 7-9, and/or a variation between and/or among different sizes for a given polygonal shape for distinct ply tiles 130, as illustrated in FIG. 9. Under these conditions, and when tile properties differ within given hybrid ply 120, the at least one tile property may include and/or be the tile shape that is defined by the at least one distinct ply tile 130 and the corresponding tile property may include and/or be a corresponding tile shape that is defined by the at least one other distinct ply tile 130.

Variations in the tile shape among distinct ply tiles 130 within given hybrid ply 120 may produce and/or generate variation in the size, volume, and/or surface area of the ply tiles within the given hybrid ply. With this in mind, and when tile properties differ within given hybrid ply 120, the at least one tile property additionally or alternatively may include and/or be the size, the volume, and/or the surface area that is defined by the at least one distinct ply tile 130 and the corresponding tile property may include and/or be a corresponding size, volume, and/or surface area that is defined by the at least one other distinct ply tile 130.

Figures 10, 11:
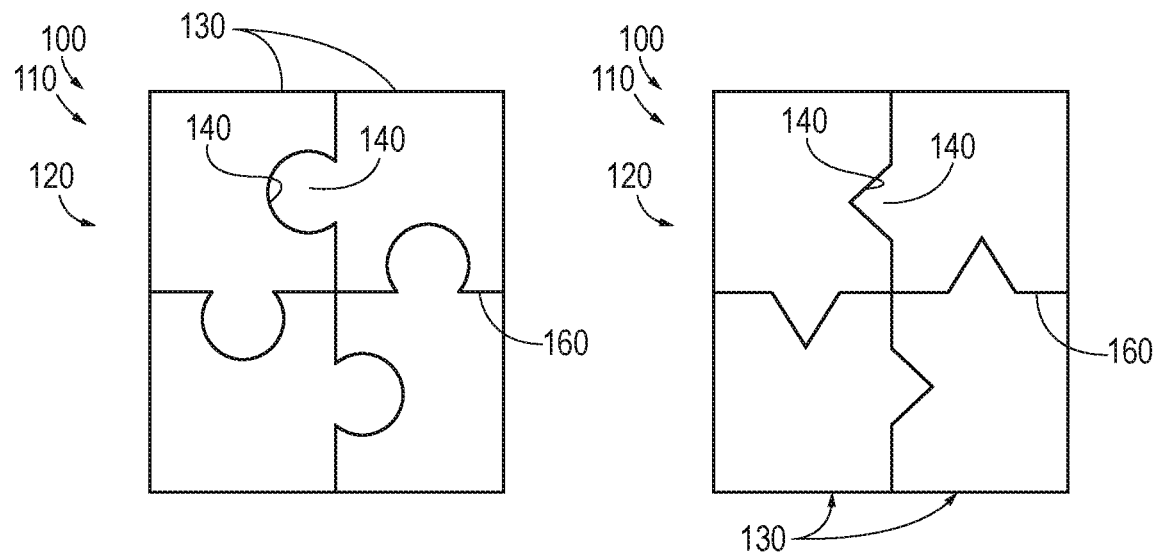
FIG. 10 is a another schematic top view illustrating an example of a hybrid ply according to the present disclosure.
FIG. 11 is a another schematic top view illustrating an example of a hybrid ply according to the present disclosure.

As illustrated in dashed lines in FIG. 2 and in solid lines in FIGS. 10-11, distinct ply tiles 130 may include an interlocking structure 140. Interlocking structure 140 of a given distinct ply tile 130, when present, may be sized, shaped, and/or configured to interlock with a corresponding interlocking structure 140 of another, or of an adjacent, distinct ply tile 130, such as to decrease a potential for separation of distinct ply tiles 130 within hybrid ply 120 during assembly of the hybrid ply, during curing of composite part 100 that includes the hybrid ply, after curing of the composite part, and/or while the composite part is being utilized. As perhaps best illustrated in FIGS. 10-11, interlocking structure 140 may at least partially define, or be defined by, the tile shape of distinct ply tiles 130.

It is within the scope of the present disclosure that distinct ply tiles 130 may include and/or be single-layer distinct ply tiles 130, such as may be formed and/or defined by a single layer of composite material. Additionally or alternatively, and as illustrated in dashed lines in FIG. 1, distinct ply tiles 130 may include at least one layered ply tile 132 that includes a plurality of tile layers 134. Stated another way, hybrid plies 120 may include a combination of single-layer distinct ply tiles 130 and layered ply tiles 132. Under these conditions, and when tile properties differ within given hybrid ply 120, the at least one tile property may include and/or be a number of tile layers in the at least one distinct ply tile 130 and the corresponding tile property may include and/or be a corresponding number of tile layers in the at least one other distinct ply tile 130.

As discussed, distinct ply tiles 130 may be formed and/or defined by a composite fiber 180 and a resin material 182. In such distinct ply tiles 130, composite fiber 180 may have and/or define a fiber direction that may extend, or may be defined, along a longitudinal axis, or a length, of the composite fiber. It is within the scope of the present disclosure that the fiber direction of all distinct ply tiles 130 may be similar, or at least substantially similar. Stated another way, composite fibers 180 of all distinct ply tiles 130 may be parallel, or at least substantially parallel. Such a configuration is illustrated in FIGS. 7 and 9.

Alternatively, it is within the scope of the present disclosure that distinct ply tiles 130 may be oriented, relative to one another, such that the at least one distinct ply tile 130 defines a first fiber direction and the at least one other distinct ply tile defines a second fiber direction that differs from the first fiber direction. This is illustrated in FIGS. 5 and 8. Under these conditions, and when tile properties differ within given hybrid ply 120, the at least one tile property may include and/or be the first fiber direction and the corresponding tile property may include and/or be the second fiber direction.

The first fiber direction and the second fiber direction may define an angle of intersection therebetween. Examples of the angle of intersection are discussed herein with reference to methods 300 of FIG. 13. Construction of hybrid ply 120 via distinct ply tiles 130 may permit and/or facilitate variations in fiber direction that may be impractical, or impossible, utilizing conventional layup methods. This ability to selectively vary the fiber orientation, such as via selective rotation of a given distinct ply tile 130 and/or formation of the given distinct ply tile 130 with a predetermined fiber direction, may permit and/or facilitate control and/or regulation of material properties of composite part 100 in a manner that may be impractical, or impossible, with conventional composite parts that do not include hybrid plies 120.

As discussed, composite material generally is laid up in an uncured state and then cured to produce and/or generate composite parts 100. It is within the scope of the present disclosure that distinct ply tiles 130 may include and/or be uncured distinct ply tiles 130 that are laid up and/or assembled and subsequently cured to produce and/or generate composite part 100. However, it is also within the scope of the present disclosure that at least a subset of distinct ply tiles 130 within a given hybrid ply 120 may be pre-cured and/or at least partially pre-cured. Under these conditions, and when tile properties differ within given hybrid ply 120, the at least one tile property may include and/or be a state-of-cure of the at least one distinct ply tile and the corresponding tile property may include and/or be a corresponding state-of-cure of the at least one other distinct ply tile. The state-of-cure of the at least one distinct ply tile may be greater than the corresponding state-of-cure of the at least one other distinct ply tile and/or less than the corresponding state-of-cure. Additionally or alternatively, the state-of-cure of the at least one distinct ply tile may include and/or be a fully cured state.

As illustrated in FIGS. 2 and 5-11, hybrid ply 120 may define a plurality of edge interface regions 160 with and/or between adjacent distinct ply tiles 130. It is within the scope of the present disclosure that the plurality of edge interface regions 160 may include and/or be any suitable interface, or joint, between the adjacent distinct ply tiles 130. As an example, and as illustrated in FIG. 2, the plurality of edge interface regions 160 may include at least one butt joint 162. As another example, and as also illustrated in FIG. 2, the plurality of edge interface regions 160 may include at least one lap joint 164.

It is also within the scope of the present disclosure that edge interface regions 160 may be arranged, within hybrid ply 120, in any suitable manner. As an example, edge interface regions 160 may be aligned in a regular grid, array, and/or repeating pattern. Such a configuration may permit and/or facilitate rapid assembly and/or lay-up of hybrid ply 120. As another example, edge interface regions 160 may be staggered and/or otherwise spaced-apart from one another. Such a configuration may decrease a potential for crack formation and/or propagation within composite part 100.

Each distinct ply tile 130 may be referred to herein as defining a corresponding edge region 170. Edge regions 170 may have and/or define any suitable shape. As examples, edge regions 170 may be planar and/or may be linear and/or flat in one direction or in two perpendicular directions, as indicated in FIG. 2 at 174. As another example, edge regions 170 may be nonplanar, nonlinear, and/or crenulated, as indicated in FIG. 2 at 172. Such nonplanar, nonlinear, and/or crenulated edge regions 170 may increase a surface area for contact between adjacent distinct ply tiles 130 within edge interface regions 160 and/or may permit and/or facilitate interleaving and/or interlocking of adjacent distinct ply tiles 130 within the edge interface regions.

As discussed, composite part 100 includes a plurality of plies 110 of composite material and at least one ply 110 is a hybrid ply 120 that includes a plurality of distinct ply tiles 130. It is within the scope of the present disclosure that the plurality of plies 110 may include at least one ply and/or at least one other ply that is separate and/or distinct from hybrid ply 120. The at least one ply may include and/or be another hybrid ply 120. The at least one ply may include and/or be a conventional composite layer, a uniform composite layer, and/or a continuous ply 110. The at least one ply 110 may extend on a first side of hybrid ply 120, and the at least one other ply 110 may extend on a second side of hybrid ply 120. Stated another way, hybrid ply 120 may extend between, may spatially separate, and/or may maintain a spaced-apart relationship between the at least one ply 110 and the at least one other ply 110. The at least one ply 110 and/or the at least one other ply 110 may be formed and/or defined from any suitable ply material, examples of which are disclosed herein with reference to the tile materials of distinct ply tiles 130.

Figure 12:
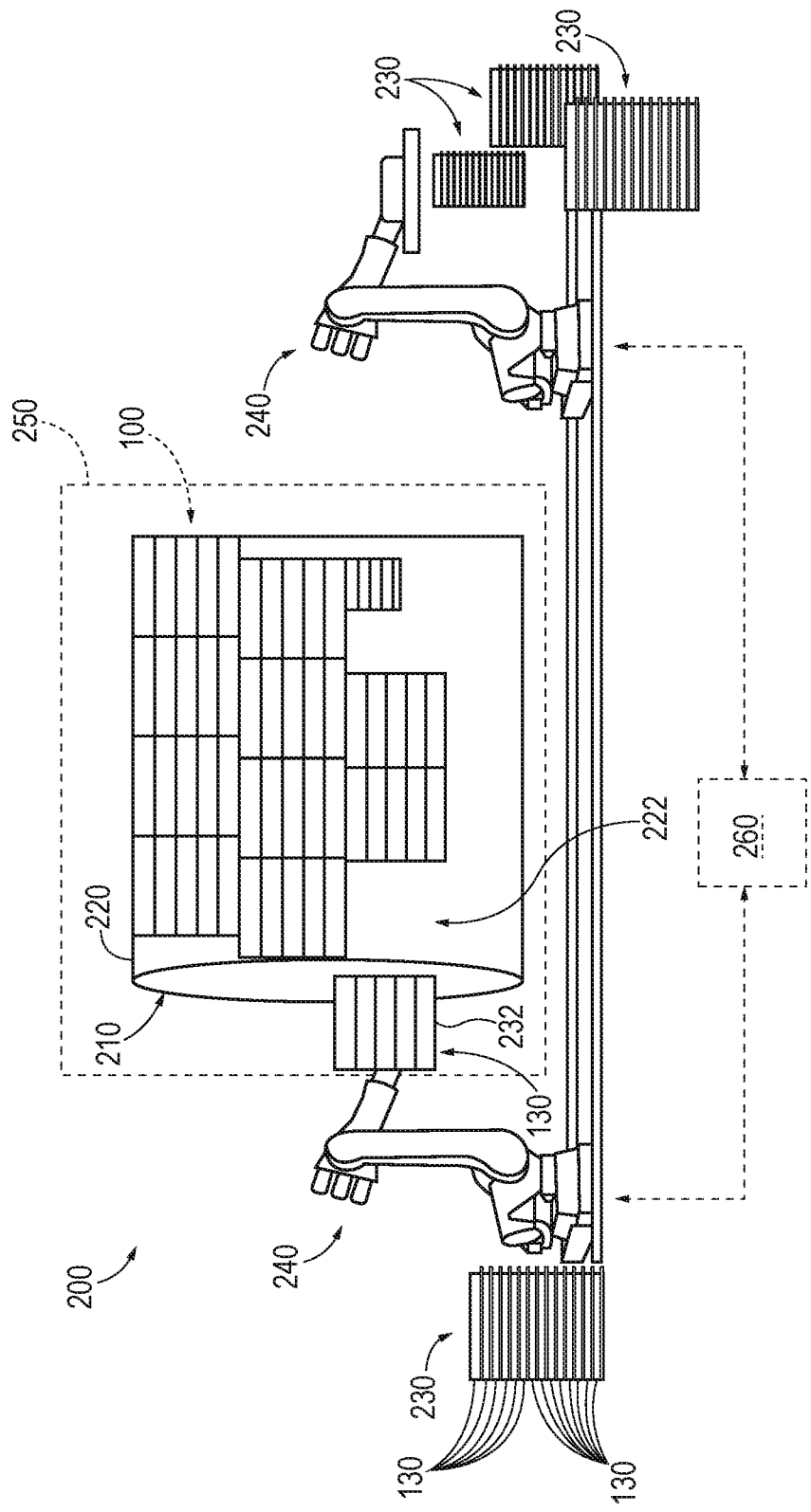
FIG. 12 is an illustration of a system for forming a composite part according to the present disclosure.

FIG. 12 is an illustration of a system 200 for forming a composite part 100, according to the present disclosure. System 200 includes a layup mandrel 210 that defines a layup surface 220. Layup surface 220 is configured to receive a plurality of plies 110 of composite material and to shape plies 110 to a desired part contour. System 200 also includes a collection, an assortment, a library, and/or a selection 230 of distinct ply tiles 130. Distinct ply tiles 130 within selection 230 may differ from one another, such as may be illustrated in FIGS. 3-4, and may be sized, shaped, configured, and/or selected to be positioned in at least one predetermined location 222 along layup surface 220. System 200 further includes a positioning device 240. Positioning device 240 may be programmed to select, from selection 230, a selected distinct ply tile 232. Positioning device 240 also may be programmed to position selected distinct ply tile 232 at a corresponding predetermined location 222 along layup mandrel 210. This process may be repeated any suitable number of times and/or with any suitable number and/or configuration of distinct ply tiles 130 to at least partially form and/or define a composite part 100. Examples of positioning device 240 include a robot and/or a pick-and-place robot.

As illustrated in dashed lines in FIG. 12, system 200 may include a heating assembly 250. Heating assembly 250, when present, may be configured to heat composite part 100 and/or distinct ply tiles 130 thereof, such as to form, to define, and/or to cure the composite part.

As also illustrated in dashed lines in FIG. 12, system 200 may include a controller 260. Controller 260, when present, may be adapted, configured, and/or programmed to control the operation of at least a portion of system 200, such as of positioning device 240. As an example, controller 260 may be programmed to control the operation of system 200 according to, or to perform, any suitable step of any of methods 300, which are discussed in more detail herein.

Figure 13:
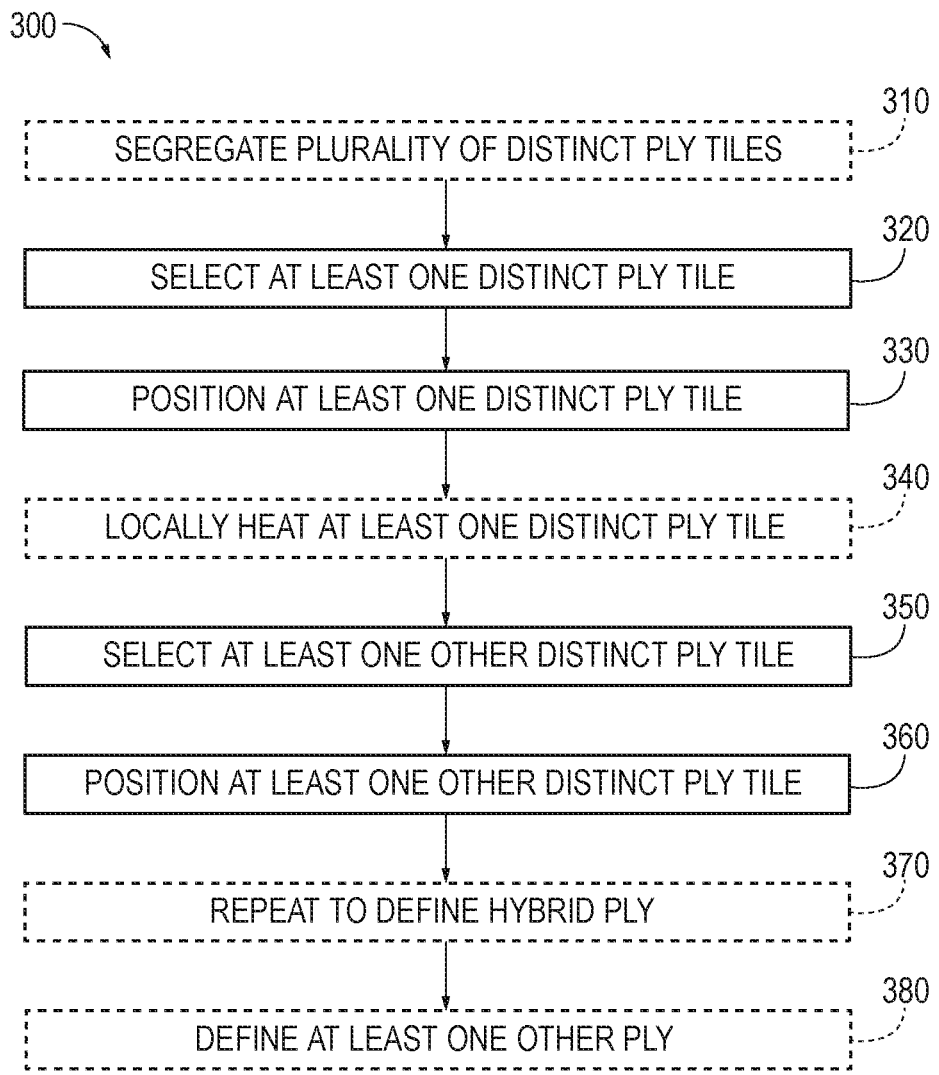
FIG. 13 is a flowchart depicting methods of forming a composite part according to the present disclosure.

FIG. 13 is a flowchart depicting methods 300 of forming a composite part, such as composite part 100 of FIGS. 1-12, according to the present disclosure. Methods 300 may include segregating a plurality of distinct ply tiles at 310 and include selecting at least one distinct ply tile at 320 and positioning the at least one distinct ply tile at 330. Methods 300 also may include locally heating the at least one distinct ply tile at 340 and include selecting at least one other distinct ply tile at 350 and positioning the at least one other distinct ply tile at 360. Methods 300 further may include repeating at least a portion of the methods to define a hybrid ply at 370 and/or defining at least one other ply at 380.

Segregating the plurality of distinct ply tiles at 310 may include segregating the plurality of distinct ply tiles and/or a selection of distinct ply tiles into a plurality of tile categories. Stated another way, and as discussed herein, one or more of the ply tiles in the plurality of distinct ply tiles may differ from one or more other ply tiles in the plurality of distinct ply tiles. With this in mind, the segregating at 310 may include segregating based, at least in part, upon tile properties of and/or upon tile property variation among the plurality of distinct ply tiles. Stated yet another way, the segregating at 310 may include collecting similar, or functionally identical, ply tiles within corresponding tile categories and/or separating different, or functionally dissimilar, ply tiles into different tile categories. Such methods may increase and/or improve the effectiveness and/or the efficiency of methods 300 when compared to comparable methods that do not include the segregating at 310.

It is within the scope of the present disclosure that each tile category in the plurality of tile categories may correspond to at least one predetermined location along a layup surface of a layup mandrel. As such, the segregating at 310 may permit, may facilitate, and/or may speed the selecting at 320 and/or the selecting at 350. Stated another way, and when methods 300 include the segregating at 310, the selecting at 320 and/or the selecting at 350 may include selecting from among the plurality of tile categories. Stated yet another way, any distinct ply tile from a given tile category may be selected, during the selecting at 320 and/or during the selecting at 350, to be positioned at any predetermined location to which the given tile category corresponds.

Selecting the at least one distinct ply tile at 320 may include selecting from the selection of distinct ply tiles and/or from the plurality of tile categories. Similarly, selecting the at least one other distinct ply tile at 350 may include selecting from the selection of distinct ply tiles and/or from the plurality of tile categories. The selecting at 320 and the selecting at 350 may be based, at least in part, on any suitable criteria. As an example, the selecting at 320 and/or the selecting at 350 may include selecting to provide selective, designed, and/or purposeful variation in one or more properties of the composite part as a function of location within the composite part. This may include selecting such that at least one tile property of the at least one distinct ply tile differs from a corresponding tile property of the at least one other distinct ply tile, as is discussed herein with reference to composite parts 100 and/or distinct ply tiles 130 of FIGS. 1-12. This also may include selecting based, at least in part, on the at least one tile property and/or based, at least in part, on the at least one other tile property.

As additional examples, the selecting at 320 may include selecting based, at least in part, on a function of a portion of the composite part that is shaped by the predetermined location along the layup surface and/or on a function of a portion of the composite part that is shaped by the other predetermined location along the layup surface. Examples of the function of the portion of the composite part that is defined by the predetermined location and/or by the other predetermined location include a door surround of an aircraft, a window surround of the aircraft, a fastener pad-up, an interface between two major structural components of the aircraft, and/or a main body of the major structural component of the aircraft.

As more specific examples, the selecting at 320 and/or the selecting at 350 may include selecting based, at least in part, on a desired mechanical characteristic of the portion of the composite part that is shaped by the predetermined location and/or on a desired mechanical characteristic of the portion of the composite part that is shaped by the other predetermined location. Examples of the desired mechanical characteristic include a desired rigidity, a desired stiffness, a desired flexibility, and/or a desired thickness.

As other more specific examples, the selecting at 320 and/or the selecting at 350 may include selecting based, at least in part, on a desired electrical characteristic of the portion of the composite part that is shaped by the predetermined location and/or on a desired electrical characteristic of the portion of the composite part that is shaped by the other predetermined location. Examples of the desired electrical characteristic include a desired electrical conductivity, a desired electrical resistivity, and/or a desired lightning protection of and/or provided by the predetermined location and/or by the other predetermined location.

It is within the scope of the present disclosure that the selecting at 320 and/or the selecting at 350 may include selecting to permit and/or to facilitate formation of a complex surface contour within the composite part. As an example, the at least one distinct ply tile and/or the at least one other distinct ply tile may be selected to provide high-quality and/or wrinkle-free layup within regions of the complex surface contour.

It is within the scope of the present disclosure that the selecting at 320 and/or that the selecting at 350 may be performed with any suitable timing and/or sequence during methods 300. As an example, the selecting at 320 may be performed prior to the positioning at 330. Stated another way, the positioning at 330 may include positioning the at least one ply tile that was selected during the selecting at 320. As another example, the selecting at 350 may be performed prior to the positioning at 360. Stated another way, the positioning at 360 may include positioning the at least one other ply tile that was selected during the selecting at 350. In some examples, the selecting at 320 and the selecting at 350 may be performed as part of a design process for the hybrid ply. In these examples, the selecting at 320 and the selecting at 350 both may be performed prior to the positioning at 330 and also prior to the positioning at 360.

Positioning the at least one distinct ply tile at 330 may include positioning the at least one distinct ply tile at the predetermined location along the layup surface of the layup mandrel. This may include positioning the at least one distinct ply tile to form and/or define a first region of a hybrid ply of the composite part. Similarly, positioning the at least one other distinct ply tile at 360 may include positioning the at least one other distinct ply tile at the other predetermined location along the layup surface of the layup mandrel. This may include positioning the at least one other distinct ply tile to form and/or define a second region of the hybrid ply of the composite part.

As discussed herein, the at least one distinct ply tile and the at least one other distinct ply tile may include composite fibers. Under these conditions, the positioning at 330 may include positioning such that the at least one distinct ply tile defines a first fiber direction and also such that the at least one other distinct ply tile defines a second fiber direction that differs from the first fiber direction. As such, the first fiber direction and the second fiber direction may define an angle of intersection therebetween. The angle of intersection may be specified, such as during the positioning at 330 and/or during the positioning at 360, to provide a desired mechanical property for the composite part and/or to provide crack arrestment within the composite part.

Examples of the angle of intersection include acute angles, angles that exclude 0 degrees, angles that exclude 45 degrees, and/or angles that exclude 90 degrees. Additional examples of the angle of intersection include angles of at least 0 degrees, at least 5 degrees, at least 10 degrees, at least 15 degrees, at least 20 degrees, at least 25 degrees, at least 30 degrees, at least 35 degrees, at least 40 degrees, at least 45 degrees, at least 50 degrees, at least 55 degrees, at least 60 degrees, at least 70 degrees, at least 80 degrees, and/or at least 85 degrees. Further examples of the angle of intersection include angles of at most 90 degrees, at most 85 degrees, at most 80 degrees, at most 75 degrees, at most 70 degrees, at most 65 degrees, at most 60 degrees, at most 55 degrees, at most 50 degrees, at most 45 degrees, at most 40 degrees, at most 35 degrees, at most 30 degrees, at most 25 degrees, at most 20 degrees, at most 15 degrees, at most 10 degrees, and/or at most 5 degrees.

As discussed, the at least one distinct ply tile and the at least one other distinct ply tile may include corresponding interlocking structures, examples of which are disclosed herein. Under these conditions, the positioning at 330 and/or the positioning at 360 may include interlocking the at least one distinct ply tile and the at least one other distinct ply tile, such as with the corresponding interlocking structures.

It is within the scope of the present disclosure that the positioning at 330 and the positioning at 360 may include positioning such that the at least one distinct ply tile and the at least one other distinct ply tile are spaced-apart from one another. Alternatively, it is also within the scope of the present disclosure that the positioning at 330 and the positioning at 360 may include positioning such that the at least one distinct ply tile and the at least one other distinct ply tile are adjacent to one another. Under these conditions, the positioning at 330 and the positioning at 360 may include forming any suitable joint between the at least one distinct ply tile and the at least one other distinct ply tile. Examples of the joint include a butt joint, a lap joint, and/or a crenulated joint.

The positioning at 330 and/or the positioning at 360 may be performed in any suitable manner. As an example, the positioning at 330 and/or the positioning at 360 may be performed with, via, and/or utilizing a positioning device, examples of which are disclosed herein.

Locally heating the at least one distinct ply tile at 340 may include increasing a temperature of the at least one distinct ply tile, such as to partially and/or fully cure the at least one distinct ply tile, to at least temporarily adhere the at least one distinct ply tile to the layup mandrel, and/or to facilitate conformation of the at least one distinct ply tile to a surface contour of the predetermined location along the layup surface. The locally heating at 340, when performed, may be performed subsequent to the selecting at 320, subsequent to the positioning at 330, prior to the selecting at 350, and/or prior to the positioning at 360.

Repeating at least the portion of the methods to define a hybrid ply at 370 may include repeating any suitable portion, or subset, of methods 300 in any suitable manner and/or in any suitable order to define, or to fully define, the hybrid ply. As an example, the repeating at 370 may include selecting each distinct ply tile in the selection of distinct ply tiles and positioning each distinct ply tile at a corresponding predetermined location on and/or along the layup surface of the layup mandrel.

Defining the at least one other ply at 380 may include defining another ply that is separate from, is distinct from, is layered with, is interleaved with, is layered above, and/or is layered below the hybrid ply. Stated another way, the defining at 380 may include increasing a number of plies that defines the composite part and/or layering two or more plies upon one another to produce and/or define the composite part. It is within the scope of the present disclosure that the other ply may include and/or be another hybrid ply. Under these conditions, the defining at 380 may include repeating the selecting at 320, the positioning at 330, the selecting at 350, the positioning at 360, and/or the repeating at 370 to define the at least one other ply. Additionally or alternatively, it is also within the scope of the present disclosure that the at least one other ply may include and/or be a uniform composite layer, such as may be formed and/or defined via conventional composite layup techniques. Under these conditions, the defining at 380 may include positioning the uniform composite layer in contact, or in face-to-face contact, with the hybrid ply.

Figure 14:
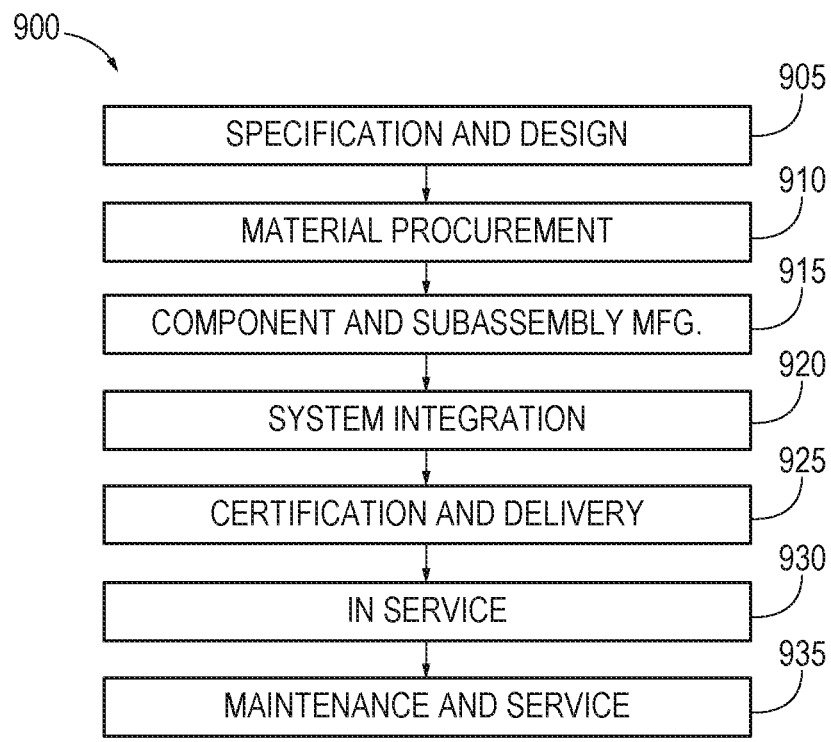
FIG. 14 is a flow diagram of aircraft production and service methodology.
Figure 15:
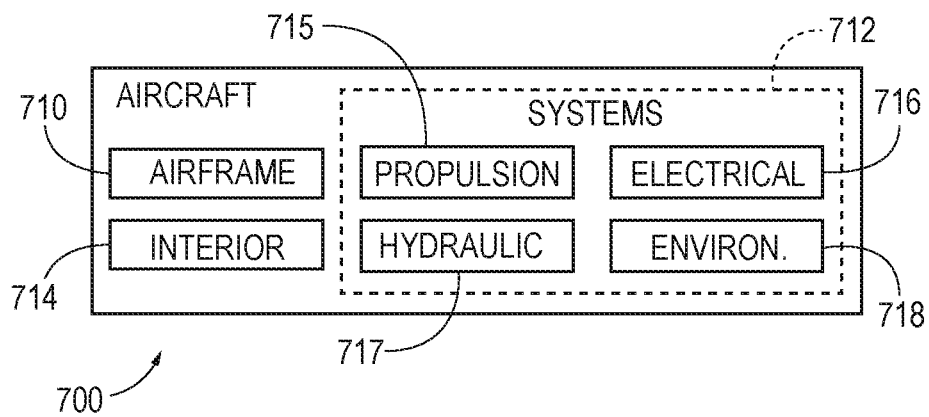
FIG. 15 is a block diagram of an aircraft.

Referring now to FIGS. 14-15, embodiments of the disclosure may be described in the context of an aircraft manufacturing and service method 900, as shown in FIG. 14, and an aircraft 700, as shown in FIG. 15. During pre-production, method 900 may include specification and design at 905 of the aircraft 700 and material procurement at 910. During production, component and subassembly manufacturing process at 915 and system integration at 920 of the aircraft 700 takes place. Thereafter, the aircraft 700 may go through certification and delivery at 925 in order to be placed in service at 930. While in service by a customer, the aircraft 700 is scheduled for routine maintenance and service at 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 700 produced by system method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Apparatus and methods embodied herein may be employed during any one or more of the stages of method 900. For example, components or subassemblies corresponding to component and subassembly manufacturing at 915 may be fabricated or manufactured in a manner similar to components or subassemblies produced while the aircraft 700 is in service. Also, one or more apparatus embodiments, method embodiments, or a combination thereof may be utilized during the production stages at 915 and 920, for example, by substantially expediting assembly of or reducing the cost of an aircraft 700. Similarly, one or more of apparatus embodiments, method embodiments, or a combination thereof may be utilized while the aircraft 700 is in service, for example and without limitation, to maintenance and service at 935.

Illustrative, non-exclusive examples of inventive subject matter according to the present disclosure are described in the following enumerated paragraphs:

A1. A composite part, comprising:

a plurality of plies of composite material, wherein at least one ply in the plurality of plies of composite material is a hybrid ply defined by a plurality of distinct ply tiles, and optionally wherein at least one distinct ply tile in the plurality of distinct ply tiles defines at least one ply tile property that differs from a corresponding ply tile property of at least one other distinct ply tile in the plurality of distinct ply tiles.

A2. The composite part of paragraph A1, wherein the at least one ply tile property includes at least one of, or is selected from the group consisting of:

(i) a tile shape of the at least one ply tile;

(ii) a tile thickness of the at least one ply tile;

(iii) a tile material of the at least one ply tile;

(iv) a fiber orientation within the at least one ply tile;

(v) a ply orientation of the at least ply tile within the hybrid ply;

(vi) a ply size of the at least one ply tile; and (vii) a weight fraction of resin material within the at least one ply tile.

A3. The composite part of any of paragraphs A1-A2, wherein the plurality of distinct ply tiles is defined by a tile material, and further wherein the tile material includes at least one of:
(i) a composite fiber;
(ii) a resin material;
(iii) a pre-impregnated composite ply;
(iv) a thermoset material;
(v) a thermoplastic material;
(vi) an aramid fiber;
(vii) a fiberglass fiber;
(viii) a graphite fiber;
(ix) a honeycomb core material;
(x) a foam;
(xi) an adhesive;
(xii) a fluoropolymer elastomer; and
(xiii) silicone.

A4. The composite part of any of paragraphs A1-A3, wherein the at least one tile property includes a/the tile material that defines the at least one distinct ply tile, and further wherein the corresponding ply tile property includes a corresponding tile material that defines the at least one other distinct ply tile.

A5. The composite part of any of paragraphs A1-A4, wherein each distinct ply tile in the plurality of distinct ply tiles defines a tile shape, and further wherein the corresponding tile shape includes at least one of:
(i) polygonal;
(ii) triangular;
(iii) square;
(iv) rectangular;
(v) hexagonal;
(vi) an interlocking structure shaped to interlock with a corresponding interlocking structure of another distinct ply tile in the plurality of distinct ply tiles.

A6. The composite part of any of paragraphs A1-A5, wherein the at least one ply tile property includes a/the tile shape defined by the at least one distinct ply tile, and further wherein the corresponding ply tile property includes a corresponding tile shape that is defined by the at least one other distinct ply tile.

A7. The composite part of any of paragraphs A1-A6, wherein the plurality of distinct ply tiles includes at least one of:
(i) at least one single-layer ply tile; and
(ii) at least one layered ply tile defined by a plurality of tile layers.

A8. The composite part of any of paragraphs A1-A7, wherein the at least one tile property includes a number of tile layers in the at least one distinct ply tile, and further wherein the corresponding ply tile property includes a corresponding number of tile layers in the at least one other distinct ply tile.

A9. The composite part of any of paragraphs A1-A8, wherein the at least one tile property includes a state-of-cure of the at least one distinct ply tile, and further wherein the corresponding ply tile property includes a corresponding state-of-cure of the at least one other distinct ply tile.

A10. The composite part of paragraph A9, wherein the state-of-cure at least one of:
(i) is greater than the corresponding state-of-cure;
(ii) is less than the corresponding state-of-cure; and
(iii) includes a fully cured state.

A11. The composite part of any of paragraphs A1-A10, wherein the composite part includes an electrical circuit at least partially defined by the plurality of distinct ply tiles.

A12. The composite part of any of paragraphs A1-A11, wherein the at least one tile property includes a circuit layout of the at least one distinct ply tile, and further wherein the corresponding ply tile property includes a corresponding circuit layout of the at least one other distinct ply tile.

A13. The composite part of any of paragraphs A1-A12, wherein the hybrid ply defines a plurality of edge interface regions between adjacent distinct ply tiles in the plurality of distinct ply tiles.

A14. The composite part of paragraph A13, wherein the plurality of edge interface regions at least one of:
(i) includes at least one butt joint; and
(ii) includes at least one lap joint.

A15. The composite part of any of paragraphs A13-A14, wherein the plurality of edge interface regions is staggered.

A16. The composite part of any of paragraphs A1-A15, wherein each distinct ply tile in the plurality of distinct ply tiles defines a corresponding edge region.

A17. The composite part of paragraph A16, wherein the corresponding edge region is crenulated, optionally such that a/the edge interface region between adjacent ply tiles in the plurality of distinct ply tiles is nonlinear.

A18. The composite part of any of paragraphs A1-A17, wherein the plurality of plies includes at least one ply that is defined by, or that consist essentially of, at least one of:
(i) a/the composite fiber;
(ii) a/the resin material;
(iii) a/the pre-impregnated composite ply;
(iv) a/the thermoset material;
(v) a/the thermoplastic material;
(vi) an/the aramid fiber;
(vii) a/the fiberglass fiber;
(viii) a/the graphite fiber;
(ix) a/the honeycomb core material;
(x) a/the foam;
(xi) an/the adhesive;
(xii) a/the fluoropolymer elastomer;
(xiii) silicone;
(xiv) a filler material;
(xv) nanoparticles; and
(xvi) a uniform composite layer.

A19. The composite part of paragraph A18, wherein the plurality of plies includes at least one other ply that is defined by, or that consist essentially of, at least one other of:
(i) a/the composite fiber;
(ii) a/the resin material;
(iii) a/the pre-impregnated composite ply;
(iv) a/the thermoset material;
(v) a/the thermoplastic material;
(vi) an/the aramid fiber;
(vii) a/the fiberglass fiber;
(viii) a/the graphite fiber;
(ix) a/the honeycomb core material;
(x) a/the foam;
(xi) an/the adhesive;
(xii) a/the fluoropolymer elastomer;
(xiii) silicone;
(xiv) a/the filler material;
(xv) nanoparticles; and
(xvi) a/the uniform composite layer.

A20. An aircraft including the composite part of any of paragraphs A1-A19.

B1. A method of forming the composite part of any of paragraphs A1-A19, the method comprising:
selecting, from a selection of distinct ply tiles, the at least one distinct ply tile;

positioning the at least one distinct ply tile at a predetermined location along a layup surface of a layup mandrel to define a first region of the hybrid ply of the composite part;

selecting, from the selection of distinct ply tiles, the at least one other distinct ply tile; and positioning the at least one other distinct ply tile at another predetermined location along the layup surface to define a second region of the hybrid ply of the composite part.

B2. The method of paragraph B1, wherein the selecting the at least one distinct ply tile and the selecting the at least one other distinct ply tile are based, at least in part, on at least one of:

(i) a function of a portion of the composite part that is shaped by the predetermined location along the layup surface;

(ii) a function of a portion of the composite part that is shaped by the other predetermined location along the layup surface;

(iii) a desired mechanical characteristic of the portion of the composite part that is shaped by the predetermined location;

(iv) a desired mechanical characteristic of the portion of the composite part that is shaped by the other predetermined location;

(v) a desired electrical characteristic of the portion of the composite part that is shaped by the predetermined location; and (vi) a desired electrical characteristic of the portion of the composite part that is shaped by the other predetermined location.

B3. The method of any of paragraphs B1-B2, wherein the selecting the at least one distinct ply tile and the selecting the at least one other distinct ply tile include facilitating formation of a complex surface contour within the composite part.

B4. The method of any of paragraphs B1-B3, wherein:

(i) the selecting the at least one distinct ply tile includes selecting the at least one distinct ply tile based, at least in part, on the at least one ply tile property; and (ii) the selecting the at least one other distinct ply tile includes selecting the at least one other distinct ply tile based, at least in part, on the at least one other tile property.

B5. The method of any of paragraphs B1-B4, wherein:

(i) the positioning the at least one distinct ply tile is such that the at least one distinct ply tile defines a first fiber direction; and (ii) the positioning the at least one other distinct ply tile is such that the at least one other distinct ply tile defines a second fiber direction that differs from the first fiber direction.

B6. The method of paragraph B5, wherein the first fiber direction and the second fiber direction define an angle of intersection therebetween.

B7. The method of paragraph B6, wherein the angle of intersection at least one of:

(i) is at least 0 degrees, at least 5 degrees, at least 10 degrees, at least 15 degrees, at least 20 degrees, at least 25 degrees, at least 30 degrees, at least 35 degrees, at least 40 degrees, at least 45 degrees, at least 50 degrees, at least 55 degrees, at least 60 degrees, at least 65 degrees, at least 70 degrees, at least 75 degrees, at least 80 degrees, or at least 85 degrees;

(ii) at most 90 degrees, at most 85 degrees, at most 80 degrees, at most 75 degrees, at most 70 degrees, at most 65 degrees, at most 60 degrees, at most 55 degrees, at most 50 degrees, at most 45 degrees, at most 40 degrees, at most 35 degrees, at most 30 degrees, at most 25 degrees, at most 20 degrees, at most 15 degrees, at most 10 degrees, or at most 5 degrees;

(iii) excludes 0 degrees;

(iv) excludes 45 degrees;

(v) excludes 90 degrees; and (vi) is acute.

B8. The method of any of paragraphs B6-B7, wherein the method includes selecting the angle of intersection to provide at least one of:

(i) a desired mechanical property for the composite part; and (ii) crack arrestment within the composite part.

B9. The method of any of paragraphs B1-B8, wherein the positioning the at least one distinct ply tile and the positioning the at least one other distinct ply tile includes interlocking the at least one distinct ply tile and the at least one other distinct ply tile.

B10. The method of any of paragraphs B1-B9, wherein the positioning the at least one distinct ply tile and the positioning the at least one other distinct ply tile includes forming at least one of:

(i) a lap joint between the at least one distinct ply tile and the at least one other distinct ply tile;

(ii) a butt joint between the at least one distinct ply tile and the at least one other distinct ply tile; and (iii) a crenulated joint between the at least one distinct ply tile and the at least one other distinct ply tile.

B11. The method of any of paragraphs B1-B10, wherein at least one of the positioning the at least one distinct ply tile and the positioning the at least one other distinct ply tile is performed utilizing at least one of a positioning device, a robot, and a pick-and-place robot.

B12. The method of any of paragraphs B1-B11, wherein the method further includes selecting each distinct ply tile in the selection of distinct ply tiles and positioning each distinct ply tile at a corresponding predetermined location to fully define the hybrid ply.

B13. The method of any of paragraphs B1-B12, wherein the method further includes defining at least one other ply in the plurality of plies.

B14. The method of paragraph B13, wherein the at least on other ply is a hybrid ply.

B15. The method of any of paragraphs B13-B14, wherein the at least one other ply is a uniform composite layer.

B16. The method of any of paragraphs B1-B15, wherein, subsequent to the positioning the at least one distinct ply tile and prior to the positioning the at least one other distinct ply tile, the method further includes locally heating the at least one distinct ply tile.

B17. The method of paragraph B16, wherein the heating includes heating to at least one of:

(i) at least temporarily adhere the at least one distinct ply tile to the layup mandrel; and (ii) facilitate conformation of the at least one distinct ply tile to a surface contour of the predetermined location along the layup surface.

B18. The method of any of paragraphs B1-B17, wherein the method further includes segregating the plurality of distinct ply tile into a plurality of tile categories.

B19. The method of paragraph B18, wherein each tile category in the plurality of tile categories corresponds to at least one predetermined location along the layup surface.

C1. A system for defining the composite part of any of paragraphs A1-A19, the system comprising:
    a layup mandrel defining a layup surface configured to receive the plurality of plies of composite material and to shape the plurality of plies of composite material to a desired part contour;
    a selection of distinct ply tiles, wherein each ply tile in the selection of distinct ply tiles is configured to be positioned in at least one predetermined location along the layup surface; and
    a positioning device programmed to select a selected distinct ply tile from the selection of distinct ply tiles and to position the selected distinct ply tile at a corresponding predetermined location along the layup mandrel to at least partially define the composite part.

C2. The system of paragraph C1, wherein the system further includes a heating assembly configured to heat the composite part to cure the composite part.

C3. The system of any of paragraphs C1-C2, wherein the positioning device includes a pick-and-place robot.

C4. The system of any of paragraphs C1-C3, wherein the system further includes a controller programmed to control the operation of the system according to any suitable step of the methods of any of paragraphs B1-B19.

D1. The use of a hybrid ply to at least partially define at least one ply in a composite part that includes a plurality of plies of composite material, wherein the hybrid ply is defined by a plurality of distinct ply tiles, and further wherein at least one distinct ply tile in the plurality of distinct ply tiles defines at least one ply tile property that differs from a corresponding ply tile property of at least one other distinct ply tile in the plurality of distinct ply tiles.

D2. The use of the system of any of paragraphs C1-C4 to form the composite part of any of paragraphs A1-A19.

D3. The use of the method of any of paragraphs B1-B19 to form the composite part of any of paragraphs A1-A19.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and systems, and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A composite part, including a plurality of plies of composite material, wherein:
    at least one ply in the plurality of plies of composite material is a hybrid ply, defined by a plurality of distinct ply tiles,
    at least one distinct ply tile in the plurality of distinct ply tiles defines at least one ply tile property that differs from a corresponding ply tile property of at least one other distinct ply tile in the plurality of distinct ply tiles; and each distinct ply tile in the plurality of distinct ply tiles includes an interlocking structure, shaped to interlock with a corresponding interlocking structure of another distinct ply tile in the plurality of distinct ply tiles.

2. The composite part of claim 1, wherein the at least one ply tile property is selected from the group consisting of:
   (i) a tile shape of the at least one ply tile;
   (ii) a tile thickness of the at least one ply tile;
   (iii) a tile material of the at least one ply tile;
   (iv) a fiber orientation within the at least one ply tile;
   (v) a ply orientation of the at least one ply tile within the hybrid ply;
   (vi) a ply size of the at least one ply tile; and
   (vii) a weight fraction of resin material within the at least one ply tile.

3. The composite part of claim 1, wherein:
   the at least one ply tile property includes a tile material that defines the at least one distinct ply tile, and
   the corresponding ply tile property includes a corresponding tile material that defines the at least one other distinct ply tile.

4. The composite part of claim 1, wherein:
   the at least one ply tile property includes a tile shape, defined by the at least one distinct ply tile, and
   the corresponding ply tile property includes a corresponding tile shape that is defined by the at least one other distinct ply tile.

5. The composite part of claim 1, wherein:
   the at least one ply tile property includes a number of tile layers in the at least one distinct ply tile, and
   the corresponding ply tile property includes a corresponding number of tile layers in the at least one other distinct ply tile.

6. The composite part of claim 1, wherein:
   the at least one ply tile property includes a state-of-cure of the at least one distinct ply tile, and
   the corresponding ply tile property includes a corresponding state-of-cure of the at least one other distinct ply tile.

7. The composite part of claim 1, wherein:
   the at least one ply tile property includes a circuit layout of the at least one distinct ply tile, and
   the corresponding ply tile property includes a corresponding circuit layout of the at least one other distinct ply tile.

8. The composite part of claim 1, wherein the hybrid ply defines a plurality of edge interface regions between adjacent distinct ply tiles in the plurality of distinct ply tiles.

9. The composite part of claim 1, wherein:
   each distinct ply tile in the plurality of distinct ply tiles defines a corresponding edge region, and
   the corresponding edge region is crenulated such that an edge interface region between adjacent ply tiles in the plurality of distinct ply tiles is nonlinear.

10. An aircraft including the composite part of claim 1.

11. A composite part, including a plurality of plies of composite material, wherein:
   at least one ply in the plurality of plies of composite material is a hybrid ply, defined by a plurality of distinct ply tiles,
   at least one distinct ply tile in the plurality of distinct ply tiles defines at least one ply tile property that differs from a corresponding ply tile property of at least one other distinct ply tile in the plurality of distinct ply tiles,
   each distinct ply tile in the plurality of distinct ply tiles defines a corresponding edge region, and
   the corresponding edge region is crenulated such that an edge interface region between adjacent ply tiles in the plurality of distinct ply tiles is nonlinear.

12. A method of forming the composite part of claim 1, the method including steps of:
   selecting, from a selection of distinct ply tiles, the at least one distinct ply tile;
   positioning the at least one distinct ply tile at a predetermined location along a layup surface of a layup mandrel to define a first region of the hybrid ply of the composite part;
   selecting, from the selection of distinct ply tiles, the at least one other distinct ply tile; and
   positioning the at least one other distinct ply tile at a second predetermined location along the layup surface to define a second region of the hybrid ply of the composite part.

13. The method of claim 12, wherein the step of selecting the at least one distinct ply tile and the step of selecting the at least one other distinct ply tile are based, at least in part, on at least one of:
   (i) a function of a portion of the composite part that is shaped by the predetermined location along the layup surface;
   (ii) a function of a portion of the composite part that is shaped by the second predetermined location along the layup surface;
   (iii) a desired mechanical characteristic of the portion of the composite part that is shaped by the predetermined location;
   (iv) a desired mechanical characteristic of the portion of the composite part that is shaped by the second predetermined location;
   (v) a desired electrical characteristic of the portion of the composite part that is shaped by the predetermined location; and
   (vi) a desired electrical characteristic of the portion of the composite part that is shaped by the second predetermined location.

14. The method of claim 12, wherein:
   (i) the step of selecting the at least one distinct ply tile includes selecting the at least one distinct ply tile based, at least in part, on the at least one ply tile property; and
   (ii) the step of selecting the at least one other distinct ply tile includes selecting the at least one other distinct ply tile based, at least in part, on the at least one ply tile property.

15. The method of claim 12, wherein:
   (i) the step of positioning the at least one distinct ply tile is such that the at least one distinct ply tile defines a first fiber direction; and
   (ii) the step of positioning the at least one other distinct ply tile is such that the at least one other distinct ply tile defines a second fiber direction that differs from the first fiber direction.

16. The method of claim 15, wherein the first fiber direction and the second fiber direction define an angle of intersection therebetween, wherein the angle of intersection is acute and excludes 0 degrees.

17. The method of claim 16, wherein the method includes selecting the angle of intersection to provide at least one of:
   (i) a desired mechanical property for the composite part; and
   (ii) crack arrestment within the composite part.

18. The method of claim 12, wherein the step of positioning the at least one distinct ply tile and the step of positioning the at least one other distinct ply tile includes interlocking the at least one distinct ply tile and the at least one other distinct ply tile.

19. The method of claim 12, wherein, subsequent to the step of positioning the at least one distinct ply tile and prior to the step of positioning the at least one other distinct ply tile, the method further includes locally heating the at least one distinct ply tile.

20. A system for defining the composite part of claim 1, the system including:
- a layup mandrel defining a layup surface configured to receive the plurality of plies of composite material and to shape the plurality of plies of composite material to a desired part contour;
- a selection of distinct ply tiles, wherein each distinct ply tile in the selection of distinct ply tiles is configured to be positioned in at least one predetermined location along the layup surface; and
- a positioning device programmed to select a selected distinct ply tile from the selection of distinct ply tiles and to position the selected distinct ply tile at a corresponding predetermined location along the layup mandrel to at least partially define the composite part.

* * * * *